US005478594A

United States Patent [19]
Frye et al.

[11] Patent Number: 5,478,594
[45] Date of Patent: Dec. 26, 1995

[54] ELECTRODE STRUCTURE FOR NICKEL METAL HYDRIDE CELLS

[75] Inventors: Blake Frye; Sam Pensabene; Vince Puglisi, all of Gainesville, Fla.

[73] Assignee: Eveready Battery Company, Inc., St. Louis, Mo.

[21] Appl. No.: 113,156

[22] Filed: Aug. 27, 1993

[51] Int. Cl.⁶ .............................. B05D 5/12; H01M 4/62; H01M 6/00
[52] U.S. Cl. ................... 427/58; 29/623.5; 427/302; 429/42; 429/212; 429/217; 429/223
[58] Field of Search ............................ 429/42, 209, 212, 429/217, 223, 101; 29/623.5; 427/421, 429, 430.1, 58, 302

[56] References Cited

U.S. PATENT DOCUMENTS

| | | | |
|---|---|---|---|
| 3,600,230 | 8/1971 | Stachurski et al. | 429/44 |
| 4,232,100 | 11/1980 | Magnusson et al. | 429/217 |
| 4,529,672 | 7/1985 | Howard et al. | 429/217 |
| 4,814,242 | 3/1989 | Maxfield et al. | 429/217 |
| 4,888,259 | 12/1989 | Ebner | 429/217 |

FOREIGN PATENT DOCUMENTS

| | | | |
|---|---|---|---|
| 990784 | 6/1976 | Canada | 429/217 |
| 86439 | 7/1978 | Japan | 429/217 |

*Primary Examiner*—Wayne Langel
*Attorney, Agent, or Firm*—Robert W. Welsh

[57] ABSTRACT

An electrode is disclosed for use in a wound nickel metal hydride electrochemical cell. The electrode has an electrochemically active material carried on the substrate. The electrode includes the improvement of an effective amount of an elastic binder coating the outer surface of the active material to enhance the integrity of the electrode and to substantially inhibit infantile shorting during operation thereof.

1 Claim, 1 Drawing Sheet

ELECTRODE STRUCTURE FOR NICKEL METAL HYDRIDE CELLS

BACKGROUND OF THE INVENTION

1. Field of the Invention

The present invention relates to improved electrodes for rechargeable electrochemical cells and, more particularly, to improved electrodes for nickel metal hydride cells. Specifically, the present invention relates to an improved electrode design for nickel metal hydride cells which significantly inhibits the infantile shorting of the wound cells.

2. Description of the Prior Art

Generally, the manufacture and use of electrodes for electrochemical cells, including nickel metal hydride cells, is known to those skilled in the art. Such electrodes usually include a porous or perforated conductive metal substrate onto which is deposited a layer of electrochemically active material. The electrochemically active material may be applied to the substrate as a pressed or pasted material wherein an organic binder provides mechanical integrity. The pasted substrate is then subjected to mild heat and pressure in order to form a compact layer of active material on the substrate. Alternatively, both positive and negative electrodes may be of a sintered design. For example, a perforated or wire mesh steel substrate may be sintered with a carbonyl nickel powder layer or layers to form a porous electrode plate. The resultant porous plate is then conventionally impregnated with a solution of the electrochemically active material. Such techniques of electrode formation are well known in the art.

Once the electrodes are formed, they must then be manufactured into a cell. In one method of manufacturing cylindrical cells, a negative electrode plate and a positive electrode plate are alternated with two pieces of separator material, such as nylon. This assembly is then wound into a spiral such that the surfaces of the positive and negative electrode plates are juxtaposed throughout the cell. These cell components are generally wound around a removal arbor which is positioned within a nest having a diameter approximately that of that of the container of the electrochemical cell. U.S. Pat. No. 4,814,242, U.S. Pat. No. 4,765,799 and U.S. Pat. No. 4,929,519 all disclose Ni—Cd electrochemical cells using latex binder materials of some sort to bind the active material together. However, some are directed to Ni metal hydride cells nor the problem discussed below.

One of the difficulties with the development of the nickel metal hydride cells, including the AB2 and AB5 alloys, is that they have had a tendency to be somewhat brittle and inflexible. Thus, when the electrodes are bent when being wound, there is a tendency for the electrochemically active material to spall and flake. This tendency can at times cause penetration of the separator material and shorting of the cell. This is particularly true during the initial or infantile start-up use of the cells, with up to 10% of cells frequently being lost through internal shorting. Thus, there remains a need for developing nickel metal hydride electrodes, both positive and negative, which are much more flexible, have greater integrity, and do not spall or flake during winding without affecting the cycle life of the cell.

SUMMARY OF THE INVENTION

Accordingly, it is one object of the present invention to provide an improved electrode design which inhibits infantile shorting.

It is another object of the present invention to provide a nickel metal hydride electrode which is flexible for purposes of winding and slitting so as to prevent flaking of the electrochemical active material.

Yet another object of the present invention is to provide a sintered negative metal hydride electrode which has reduced electrical shorting tendencies yet enhanced cycle life.

To achieve the foregoing and other objects and in accordance with a purpose of the present invention as embodied and broadly described herein, an electrode is disclosed for use in a wound nickel metal hydride electrochemical cell. The electrode includes an electrochemically active material carried on a substrate. The electrode also includes an effective amount of an elastic binder coating which coats the outer surface of the active material to enhance the integrity of the electrode and to substantially inhibit infantile shorting during the operation thereof.

BRIEF DESCRIPTION OF THE DRAWINGS

The accompanying drawing which is incorporated in and forms a part of the specification illustrates a preferred embodiment of the present invention and, together with a description, serves to explain the principles of the invention. In the drawings.

DETAILED DESCRIPTION OF THE PREFERRED EMBODIMENT

Figure 1:
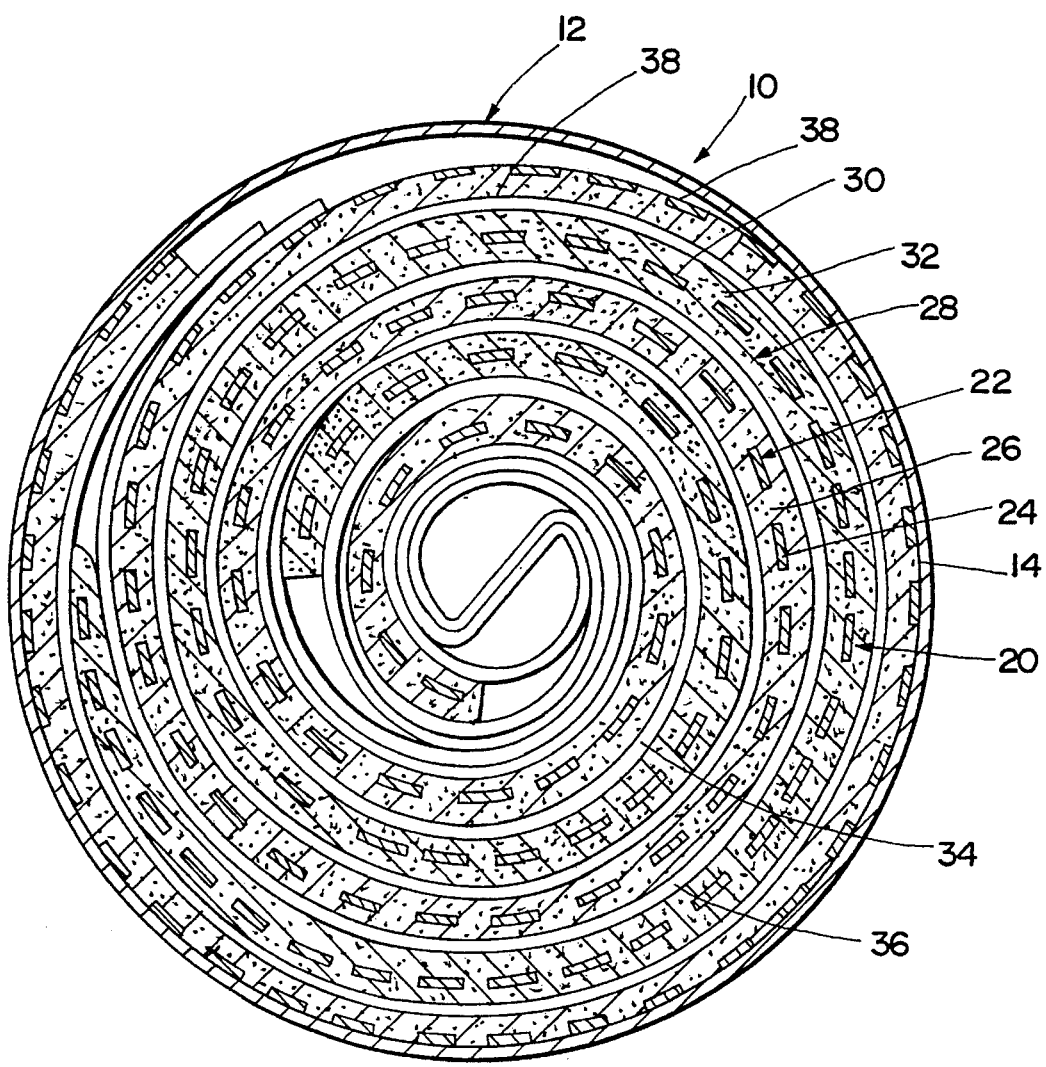
FIG. 1 is a cross-sectional view of one embodiment of a wound electrode assembly of the present invention as installed within the container of a sealed electrochemical device.

As discussed above, the present invention relates to coated electrodes for rechargeable nickel metal hydride electrochemical cells utilizing the same. Referring to FIG. 1, a sealed electrochemical cell 10 includes a container member 12 having an inner surface 14 and a wound electrode assembly 20. The electrode assembly 20 is dimensioned and configured to be disposed within the container 12 tightly against the surface 14. The container 12 may be constructed from any known material in the art suitable for its purpose, such as nickel plated steel.

Referring with more particularity to the electrode assembly 20, a negative electrode plate 22 is illustrated and includes a substrate member 24 and an electrochemically active material 26. As illustrated, the electrochemically active material is secured to both faces of the substrate 24 and may be secured to the substrate 24 in any manner known in the art such as by pressing suitable paste, which is a mixture primarily of active material and binder, onto and through the perforations of the porous substrate 24. Alternatively, the active material may be preferably bonded to the substrate 24 by means of simultaneous extrusion from a cross-head die in an organic slurry containing the active material in suspension onto both sides of the substrate, thereby permeating the substrate and forming a layer on each side thereof. As previously indicated, the electrochemically active material may also be sintered to the substrate plate 24. Likewise, a positive plate 28 is illustrated and includes a substrate material 30 and an electrochemically active material 32 secured to both faces of the substrate 30. Again, the electrochemically active material 32 may be secured to the plate 30 in any known manner as discussed above.

The selection of materials for the substrate and the electrochemically active material may be any as desired and known in the nickel metal hydride art depending on the cell desired.

In addition, the positive plate 28 and the negative plate 22 are separated by a pair of separator sheets 34, 36. The separator sheets 34, 36 are again of standard design in the art and enable flow through of electrochemically active material without direct electrical contact between the positive and negative plates. In the illustrated embodiment, the negative plate 22 is coated with an elastic binder layer 38 in accordance with the present invention. The positive plate 28 may also be coated as described below, although this coating is not illustrated in FIG. 1 for simplicity and clarification purposes.

As both the negative and positive plates 22, 28 are wound to form the cell 10, there has previously been a tendency for the electrochemically active material 26, 32 to splinter, flake and spall. Unfortunately, this sometimes resulted in the separators 34, 36 being permeated thereby causing shorts in the cell 10, particularly during initial start-up operation. Such initial shorting of the cells is termed infantile shorting and typically has resulted in at least 10% and frequently more of the new cells having to be discarded resulting from unacceptable cell performance due to such infantile shorting. While prior nickel cadmium rechargeable cells experienced a certain amount such infantile shorting, this problem became acute with nickel metal hydride cells due to the more brittle nature of the AB2 and AB5 alloys utilized in the electrodes of such cells, and in particular the negative electrode.

It was discovered that if the electrode surface was coated with a layer of an elastic binder material of sufficient thickness, this tendency for the electrochemically active material to flake and splinter was substantially reduced. When this tendency was reduced, it was discovered that the amount of infantile shorting being experienced was also substantially reduced. It was determined that a primary cause for this reduction was the fact that the elastic binder material, when present in an effective amount, added substantial flexibility to the electrode thereby off-setting to some degree the brittle nature of the electrochemically active material. In this manner, the electrodes can be wound in standard fashion without the electrochemically active material being spalled and flaked thereby reducing loss resulting from cell shorting.

While any elastic binder material suitable for the above described function may be utilized with the present invention, it is preferred that this material be a hydrophobic polymer having strong binding properties as well as high elasticity. The binding properties help confine the surface of the electrochemically active material tight to the substrate. Most preferably, the binder coating is selected from styrene-ethylene/butylene-styrene block copolymers manufactured under the trade name KRAYTON by the Shell Chemical Company.

The KRAYTON coating not only coats the electrodes to reduce flaking, but it also improves the integrity of the electrode structure. The KRAYTON coating is present in an effective amount to achieve these functions, and that effective amount is preferably no greater than approximately 0.002 inches thickness. Therefore, only a light coating is necessary to accomplish the above. If the thickness becomes to great, the hydrophobic nature of KRAYTON may cause problems during discharge inasmuch as the electrodes then become rate sensitive. However, it has been discovered that the KRAYTON also reduces the chance of the electrochemically active alloy to oxidize during cycle life thereby prolonging the cycle life of the cell if the KRAYTON is not present in too great of an amount. Since oxidation of electrochemically active alloys is a primary cause of cycle life failure for nickel metal hydride cells, this unexpected function is an added advantage to the preferred KRAYTON coating. Moreover, in the AB5 electrochemical cell structure, the AB5 alloy tends to grow and expand when cycled thereby loosing its compacted nature. This tendency previously migrated has the electrochemical active material into the separator during such expansion and also during initial construction as a result from ultrasonic welding. The KRAYTON coating provides additional integrity to the electrode thereby preventing such expansion into the separator.

The binder coating may be applied to the positive and negative electrodes utilizing any number of available techniques. In one instance, the electrodes may be simply dipped into liquid KRAYTON or other liquid binder, depending upon the selection. For purposes of discussion hereafter, the preferred binder coating KRAYTON will be referred to although it is to be understood that any suitable elastic binder material as described above may be utilized. Another manner of applying the KRAYTON coating is to dip the electrodes into liquid KRAYTON and then wipe or squeeze it off as to eliminate any excess material. The KRAYTON coating may also be simply wiped or painted on to the electrode surfaces, or, in the alternative, it may be sprayed on in layers. In any event, the liquid KRAYTON is applied to the surface of the electrode in appropriate thickness and then allowed to dry.

It is believed that the KRAYTON will tend to penetrate any pores in the electrode structure thereby providing the enhanced integrity previously discussed. Moreover, certain electrode structures include grooves or other dimples in the substrate surface in order to assist in adhering the electrochemically active material to the substrate. Such structural forms in the substrate may also be reflected in the over-all electrode form after the electrochemically active material has been deposited onto the substrate. It has been discovered that the KRAYTON coating will tend to fill the dips and gaps in such grooves or dimples thereby assisting in the prevention of flaking and spalling by physically holding the splinter or flake in place and not allowing it to spall off as the electrode is wound.

Other advantages to the KRAYTON coating have been discovered. One such advance is in reducing the amount of dust generation during the winding process resulting from dust particles being discharged from the electrochemically material as the electrode is being wound. Moreover, it has been discovered that the KRAYTON coating assists in cutting or slicing the electrodes during manufacturing, since the electrode plates are generally made in large sheets and then cut to size depending upon the particular electrochemical cell size into which the electrodes are to be placed. Previous to utilizing the KRAYTON coating discussed above, such slicing or cutting operations tended to spall some of the electrochemical material from the substrate at the edges of the slice as well as to generate dust during the slicing operation. The KRAYTON coating assists in decreasing the amount of dust generation and spalling during slicing operations.

As previously discussed, it had been indicated that at least 10% of nickel metal hydride cells were being lost due to infantile shorting. In certain instances, the scrap rate has been as high as 20-50% prior to utilizing the KRAYTON coating as described above. As a result of applying the KRAYTON coating in accordance with the invention described above, the winding losses have been shown to be reduced by a factor of 5-10%. Moreover, the reduction of infantile shortage losses as compared to controls has been upward to 50%. Thus, the present invention has significantly reduced the scrap rate of nickel metal hydride cells resulting from the aforementioned problems.

EXAMPLE I

In one experiment, four types of positive sintered nickel electrodes were produced for testing in nickel metal hydride cells. These electrodes were as follows:

Type A: included a sintered plaque which was very pliable, soft, and had no tendency for the surface to break into sharp protrusions. This was placed on the electrode substrate.

Type B: a standard negative electrode plate was manufactured and then coated with a KRAYTON binder as described above.

Type C: a standard plate identical that of Type B was manufactured and then only coated at the leading edge with the KRAYTON binder, which leading edge is utilized in starting the winding during roll assembly.

Type D: the standard plate was manufactured and utilized as in electrodes B and C but had no surface treatment whatsoever.

Each positive electrode A-D was wound with a metal hydride AB2 negative plate utilizing a nylon separator and the same winding machine. For each type A-D, 50 electrode assemblies were wound and placed in electrochemical cell cans to form electrochemical cells. These cells were then placed into operation, and the shorts were detected. The results were as follows:

Type A: 0 infantile shorts
Type B: 0 infantile shorts
Type C: 4 infantile shorts
Type D: 4 infantile shorts The results of this particular Example I indicated that the Type D, sintered nickel metal electrodes for nickel metal hydride cells generated 8% shorts overall. It was also clear that by simply coating the leading edge with KRAYTON as indicated by Type C provided no additional change or reduction in shorting. Type B cells constructed in accordance with the present invention clearly indicated that the present invention would protect against infantile shorts as described above. The Type A cells also indicated that pliable and soft sintered nickel electrode surfaces which resist breakage and development of sharp protrusion also will reduce the number of infantile shorts, thereby further supporting the theory of infantile shorts as described above is correct. After testing, the above cells were taken apart and analyzed, and this analysis clearly indicated that the above shorts for Type C and D cells were the result of sharp protrusions passing through the separators.

EXAMPLE II

In this example, nickel metal hydride 4/3A cells were made utilizing AB5 compacted negative electrodes coated with about a 0.002 inch KRAYTON layer. The control electrodes had no KRAYTON, and the test cells were divided into two categories—one and two passes (applications) of KRAYTON. The results are as follows:

|  | % Shortage/Failures |
| --- | --- |
| Control | 19.4 |
| 1 layer | 7.3 |
| 2 layer | 7.1 |

As can be seen, this text clearly illustrated that the KRAYTON coating significantly reduced or inhibited infantile shortages of these cells.

EXAMPLE III

Yet another test of the present invention was performed wherein shortages due to metal particle vibration through the separator resulting from the ultrasound welding of cells was evaluated. In this instance, the same electrodes and cell types of EXAMPLE II were utilized in this test. The results are as follow:

|  | No. Tested | % Shortage/Failure |
| --- | --- | --- |
| Control | 12 | 50 |
| 1 pair | 19 | 16 |
| 2 pair | 19 | 5 |

Again, the benefits of the present invention are clearly illustrated by the results obtained and show that shortages due to manufacturing processing can also be substantially inhibited by the present invention.

As can be seen from the above, nickel metal hydride cells have experienced an unacceptable high loss rate due to electrical shortage at start up resulting from flaking and spalling of the electrochemically active material and shorting out the cells. It has been discovered that upwards to about 90% of this shortage loss results from flaking of the negative electrode, with the balance being attributed to flaking of the positive electrode. The present invention is a simple yet highly effective technique for significantly reducing this electrical shortage loss and bringing the loss to within acceptable limits. The present invention, moreover, enhances the integrity of the electrodes as well as reduces environmental problems during manufacture of the electrodes and winding of the cells. Consequently, the present invention not only provides significant economic advantages due to reduced losses but also enhanced manufacturing procedures.

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art.

We claim:

1. A process for producing an electrode for use in a nickel metal hydride cell, comprising:

forming an electrochemically active material;

applying said active material to a substrate;

coating the surface of said electrochemically active material with a liquid layer of styrene-ethylene/butylene-styrene block copolymer; and drying said layer onto the surface of said active material, said layer comprising approximately 0.002 inches in thickness or less.

* * * * *